(12) United States Patent
Takeuchi (10) Patent No.: US 10,161,110 B2
(45) Date of Patent: Dec. 25, 2018

(54) CONTROL VALVE DEVICE (71) Applicant: KYB Corporation, Tokyo (JP)

(72) Inventor: Toru Takeuchi, Kanagawa (JP)

(73) Assignee: KYB Corporation, Tokyo (JP)

( * ) Notice: Subject to any disclaimer, the term of this patent is extended or adjusted under 35 U.S.C. 154(b) by 106 days.

(21) Appl. No.: 15/121,068

(22) PCT Filed: Mar. 2, 2015

(86) PCT No.: PCT/JP2015/056044
§ 371 (c)(1),
(2) Date: Aug. 24, 2016

(87) PCT Pub. No.: WO2015/137177
PCT Pub. Date: Sep. 17, 2015

(65) Prior Publication Data
US 2016/0362871 A1 Dec. 15, 2016

(30) Foreign Application Priority Data

Mar. 12, 2014 (JP) .................. 2014-049308

(51) Int. Cl.
*E02F 9/22* (2006.01)
*F15B 13/08* (2006.01)
(Continued)

(52) U.S. Cl.
CPC ........ *E02F 9/2267* (2013.01); *F15B 13/0401* (2013.01); *F15B 13/0814* (2013.01); *F15B 13/0896* (2013.01); *F16K 11/24* (2013.01); *F16K 17/02* (2013.01); *F16K 27/00* (2013.01); *F16K 27/003* (2013.01); *E02F 3/32* (2013.01);
(Continued)

(58) Field of Classification Search
CPC ....... E02F 9/2267; E02F 3/32; F15B 13/0896; F15B 13/0814; F15B 2211/3058; F15B 2013/006; F15B 2211/40576; F15B 2211/30575; F15B 13/0401; F16K 11/24;
(Continued)

(56) References Cited

U.S. PATENT DOCUMENTS 3,224,343 A * 12/1965 Nevulis .................. E02F 3/42
   137/596.2
4,480,527 A * 11/1984 Lonnemo ............... F15B 13/02
   137/596.15
(Continued)

FOREIGN PATENT DOCUMENTS

CN   102913495 A   2/2013
DE   19537482 A1   4/1997
(Continued)

*Primary Examiner* — William McCalister
*Assistant Examiner* — Patrick Williams
(74) *Attorney, Agent, or Firm* — Rabin & Berdo, P.C.

(57) ABSTRACT

A control valve device includes a valve block that switches the flowing direction of a working fluid supplied to and discharged from a boom cylinder and an arm cylinder (actuators). The valve block includes an actuator port connected to the boom cylinder, and a supply port, a discharge port, and a regeneration port communicating with the actuator port. A supply valve is provided between the actuator port and the supply port, and a discharge valve is provided between the actuator port and the discharge port.

5 Claims, 5 Drawing Sheets (51) Int. Cl.
*F16K 27/00* (2006.01)
*F16K 11/24* (2006.01)
*F16K 17/02* (2006.01)
*F15B 13/04* (2006.01)
*F15B 13/00* (2006.01)
*E02F 3/32* (2006.01)

(52) U.S. Cl.
CPC . *F15B 2013/006* (2013.01); *F15B 2211/3058* (2013.01); *F15B 2211/30575* (2013.01); *F15B 2211/40576* (2013.01)

(58) Field of Classification Search
CPC ........ F16K 27/003; F16K 27/00; F16K 17/02; Y10T 137/87885; Y10T 137/86574
USPC .............................................. 137/884, 625.2
See application file for complete search history.

(56) References Cited

U.S. PATENT DOCUMENTS

| | | | | |
|---|---|---|---|---|
| 5,372,060 | A | * | 12/1994 | Maruyama ............. F15B 13/02 137/596.15 |
| 5,975,134 | A | | 11/1999 | Schwelm |
| 6,164,327 | A | * | 12/2000 | Yoshida ................ F15B 11/024 137/596.15 |
| 2015/0267720 | A1 | | 9/2015 | Huang et al. |

FOREIGN PATENT DOCUMENTS

| | | |
|---|---|---|
| DE | 102012203390 A1 | 9/2013 |
| JP | S59-132901 U | 9/1984 |
| JP | S63-9705 A | 1/1988 |
| JP | H09317706 A | 12/1997 |
| JP | 11-509303 A | 8/1999 |
| JP | 2010-242796 A | 10/2010 |

* cited by examiner

CONTROL VALVE DEVICE

TECHNICAL FIELD

The present invention relates to a control valve device adapted to control supply and discharge of a working fluid to and from an actuator.

BACKGROUND ART

A construction machine such as a hydraulic excavator includes a boom cylinder (hydraulic cylinder) as an actuator that drives a boom or the like, and a control valve device that controls supply and discharge of working oil to and from the boom cylinder.

JP2010-242796A discloses a control valve device including a regeneration oil passage allowing communication between a bottom chamber of a boom cylinder and a rod chamber, and a boom lowering control valve that opens and closes the regeneration oil passage.

In this control valve device, working speed of the boom cylinder is increased by opening the regeneration oil passage by the boom lowering control valve, and a discharge amount of a hydraulic pump provided in a working oil pressure source is lowered, so that power of the hydraulic pump is saved.

SUMMARY OF INVENTION

There is a control valve device for a construction machine including no regeneration oil passage according to a machine type of the construction machine. Therefore, there is a need for changing a design of a valve block accommodating valves between the control valve device of the specification including the regeneration oil passage and the control valve device of the specification including no regeneration oil passage.

In such a way, in the conventional control valve device, there is a need for manufacturing the valve block in accordance with a change of a hydraulic circuit. Thus, there is a fear that manufacturing cost is increased. Therefore, various hydraulic circuits are not easily provided in accordance with the machine type.

An object of the present invention is to provide a control valve device capable of easily providing various circuits in accordance with a machine type.

According to one aspect of the present invention, a control valve device for controlling supply and discharge of a working fluid to and from an actuator is provided. The control valve device includes a valve block configured to switch the flowing direction of the working fluid supplied to and discharged from the actuator. The valve block includes an actuator port connected to the actuator, a supply port communicating with the actuator port, a discharge port communicating with the actuator port, and a regeneration port communicating with the actuator port. The control valve device further includes a supply valve provided between the actuator port and the supply port, and a discharge valve provided between the actuator port and the discharge port.

DESCRIPTION OF EMBODIMENTS

Hereinafter, with reference to the drawings, an embodiment of the present invention will be described.

Figure 1:
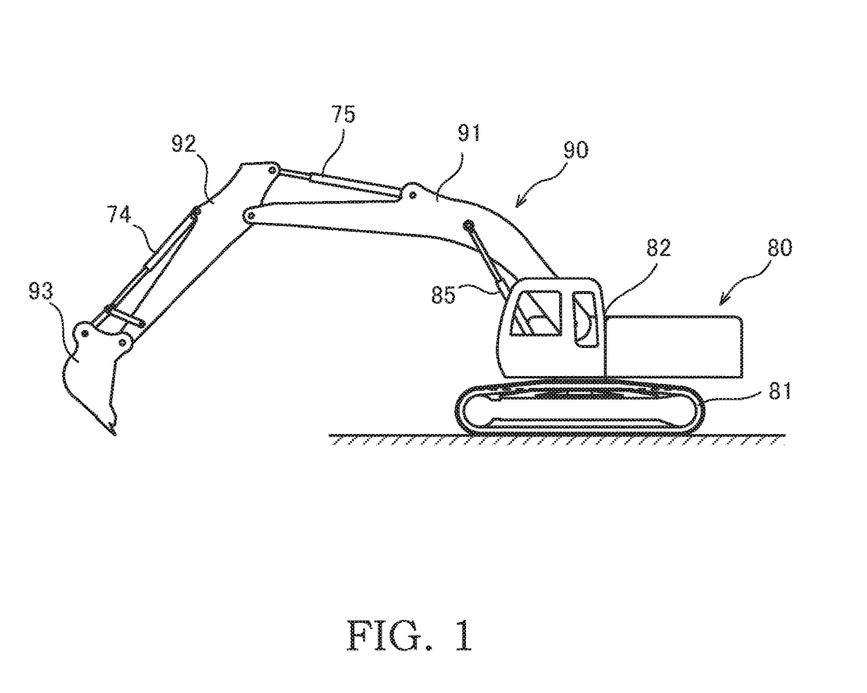
FIG. 1 is a side view of a hydraulic excavator according to an embodiment of the present invention.

As shown in FIG. 1, a hydraulic excavator (construction machine) 80 includes a crawler type lower traveling body 81, an upper rotating body 82 rotatably provided on the lower traveling body 81, and an excavating body 90 provided in a front center part of the upper rotating body 82.

The excavating body 90 includes a boom 91 supported turnably about a horizontal axis extending in the left and right direction of the upper rotating body 82, an arm 92 turnably supported on a leading end part of the boom 91, a bucket 93 turnably supported on a leading end part of the arm 92, the bucket that excavates earth and sand or the like, and a boom cylinder 85, an arm cylinder 75, and a bucket cylinder 74 provided as actuators that drive these.

Figure 2:
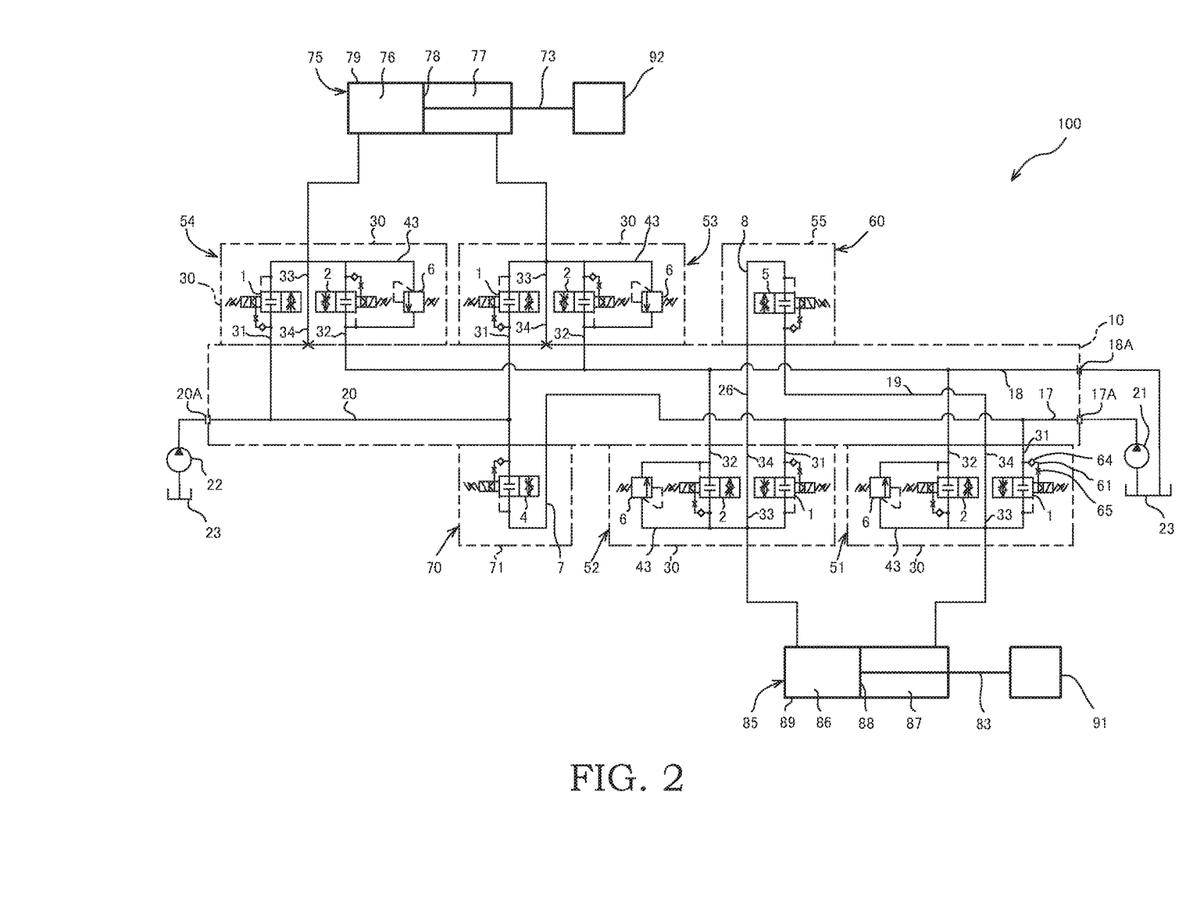
FIG. 2 is a circuit diagram of a control valve device.

A control valve device 100 shown in FIG. 2 controls supply and discharge of a working fluid to and from the boom cylinder 85 and the arm cylinder 75.

In the boom cylinder 85, a cylinder tube 89 is coupled to the upper rotating body 82, and a rod 83 extending from a piston 88 is coupled to the boom 91. An interior of the cylinder tube 89 is partitioned into a bottom side fluid pressure chamber 86 and a rod side fluid pressure chamber 87 by the piston 88. The working fluid is supplied to and discharged from the rod side fluid pressure chamber 87 by a rod side switching module 51. The working fluid is supplied to and discharged from the bottom side fluid pressure chamber 86 by a bottom side switching module 52.

In the arm cylinder 75, a cylinder tube 79 is coupled to the boom 91, and a rod 73 extending from a piston 78 is coupled to the arm 92. An interior of the cylinder tube 79 is partitioned into a bottom side fluid pressure chamber 76 and a rod side fluid pressure chamber 77 by the piston 78. The working fluid is supplied to and discharged from the rod side fluid pressure chamber 77 by a rod side switching module 53. The working fluid is supplied to and discharged from the bottom side fluid pressure chamber 76 by a bottom side switching module 54.

A base block 10 in which flow passages that guide the working fluid to the modules are formed is provided in the control valve device 100. A first pump 21 and a second pump 22 serving as fluid pressure sources, and a tank 23 storing the working fluid are connected to the base block 10. The base block 10 includes a first supply line 17 to which the working fluid is supplied from the first pump 21, a second supply line 20 to which the working fluid is supplied from the second pump 22, a discharge line 18 communicating with the tank 23, and a first regeneration line 19 and a second regeneration line 26 forming a regeneration circuit 8 to be described later. The first supply line 17 allows communication between supply ports 31 and a pump port 17A connected to the first pump 21. The second supply line 20 allows communication between the supply ports 31 and a pump port 20A connected to the second pump 22. The discharge line 18 allows communication between discharge ports 32 and a tank port 18A connected to the tank 23. Arrangement of passages provided in the base block 10 can be changed in accordance with a machine type of the hydraulic excavator into which the control valve device 100 is mounted.

The switching modules 51 to 54, a merging module 70, and a regeneration module 60 are combined with the base block 10. Each of the switching modules 51 to 54 includes a supply valve 1, a discharge valve 2, and a relief valve 6. The merging module 70 includes a merging valve 4. The regeneration module 60 includes a regeneration valve 5.

Open/close actions of the supply valve 1, the discharge valve 2, the merging valve 4, and the regeneration valve 5 are controlled by a controller (not shown) on the basis of an operation of an operator.

At the time of turning the arm 92, in the switching modules 53, 54, communication of the first supply line 17 and the discharge line 18 with the bottom side fluid pressure chamber 76 and the rod side fluid pressure chamber 77 of the arm cylinder 75 is switched by open/close actions of the supply valves 1 and the discharge valves 2. Thereby, the working fluid is supplied to and discharged from the arm cylinder 75, so that the arm 92 is turned.

At the time of turning the boom 91, in the switching modules 51, 52, communication of the first supply line 17 and the discharge line 18 with the rod side fluid pressure chamber 87 and the bottom side fluid pressure chamber 86 of the boom cylinder 85 is switched by open/close actions of the supply valves 1 and the discharge valves 2. Thereby, the working fluid is supplied to and discharged from the boom cylinder 85, so that the boom 91 is turned.

At the time of turning the boom 91, when the merging valve 4 is actuated and opened in the merging module 70, the first supply line 17 and the second supply line 20 communicate with each other. Thereby, the working fluids supplied from both the first supply line 17 and the second supply line 20 are merged and guided to the boom cylinder 85, so that working speed of the boom cylinder 85 is increased.

At the time of turning the boom 91 upward, in the regeneration module 60, the regeneration circuit 8 that provides a short-circuit between the rod side fluid pressure chamber 87 and the bottom side fluid pressure chamber 86 of the boom cylinder 85 is opened by actuating and opening the regeneration valve 5. Thereby, the rod side fluid pressure chamber 87 of the boom cylinder 85 has the same pressure as the bottom side fluid pressure chamber 86. Thus, a pressure receiving area on which the pressure of the working fluid acts for generating thrust force of the boom cylinder 85 is reduced from a sectional area of the piston 88 to a sectional area of the rod 83. Thereby, whereas the thrust force generated in the boom cylinder 85 is reduced, the working speed of actuating and extending the boom cylinder 85 is increased and discharge amounts of the first pump 21 and the second pump 22 are lowered, so that power is saved.

Hereinafter, with reference to FIGS. 3 to 5, a specific configuration of the control valve device 100 will be described. It should be noted that in the figures, three axes of X, Y, Z orthogonal to each other are set, the X axis extends in the horizontal front and rear direction, the Y axis extends in the horizontal lateral direction, and the Z axis extends in the up and down direction (vertical direction).

Figure 3:
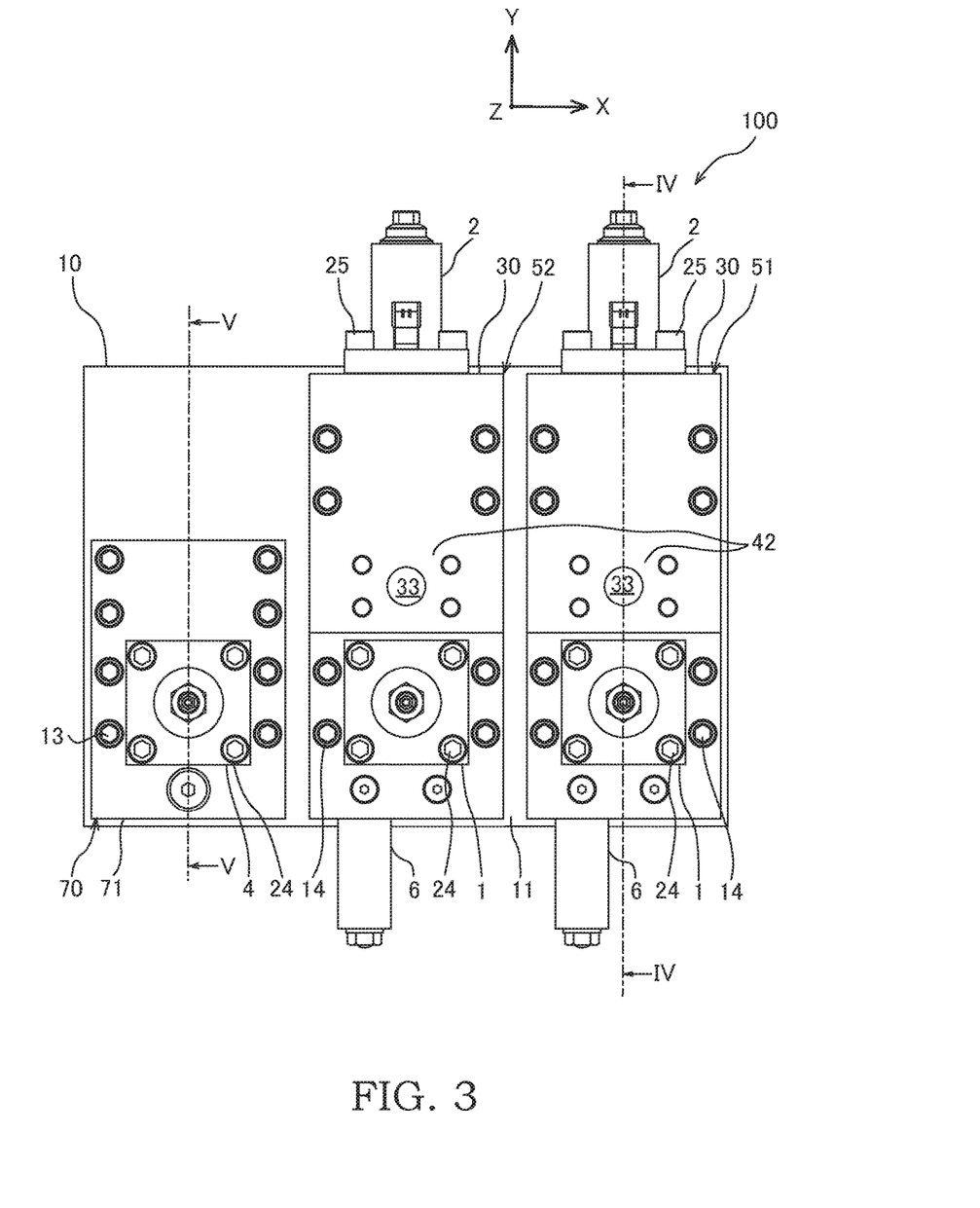
FIG. 3 is a plan view of the control valve device.
Figure 4:
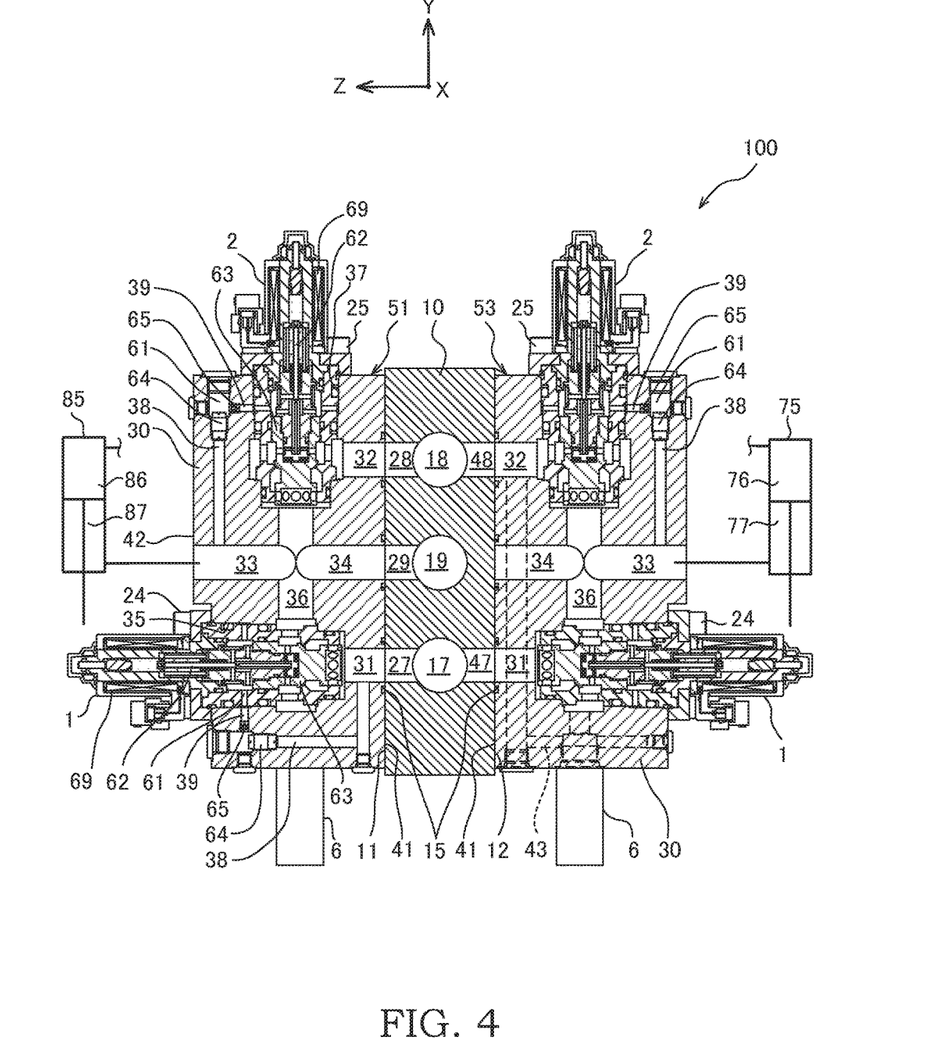
FIG. 4 is a sectional view taken along the line IV-IV of FIG. 3.

As shown in FIGS. 3, 4, the cubic base block 10 has a first attachment surface 11 and a second attachment surface 12 extending in the X and Y axis directions in parallel to each other.

Onto the first attachment surface 11, the rod side switching module 51 and the bottom side switching module 52 that switch supply and discharge of the working fluid to and from the boom cylinder 85, and the merging module 70 are attached side by side.

Onto the second attachment surface 12, the rod side switching module 53 and the bottom side switching module 54 that switch supply and discharge of the working fluid to and from the arm cylinder 75, and the regeneration module 60 are attached side by side in the X axis direction.

Each of the switching modules 51 to 54 includes a valve block 30 combined with the base block 10 via a plurality of bolts 14. The cubic valve block 30 has a first bonding surface 41 and a second bonding surface 42 extending in the X and Y axis directions in parallel to each other. A plurality of seal rings 15 is placed between the first attachment surface 11 and the second attachment surface 12 of the base block 10 and the first bonding surfaces 41 of the valve blocks 30. Port connection parts to be described later are sealed by the seal rings 15.

An actuator port 33 extending in the Z axis direction is opened on the second bonding surface 42 of the valve block 30. The actuator ports 33 of the switching modules 51 to 54 communicate with the fluid pressure chambers 86,87,76,77 through pipes (not shown) connected to the respective second bonding surfaces 42.

The actuator port 33 in the valve block 30 of the rod side switching module 51 of the boom cylinder 85 communicates with the rod side fluid pressure chamber 87 of the boom cylinder 85.

The actuator port 33 in the valve block 30 of the bottom side switching module 52 of the boom cylinder 85 communicates with the bottom side fluid pressure chamber 86 of the boom cylinder 85.

The actuator port 33 in the valve block 30 of the rod side switching module 53 of the arm cylinder 75 communicates with the rod side fluid pressure chamber 77 of the arm cylinder 75.

The actuator port 33 in the valve block 30 of the bottom side switching module 54 of the arm cylinder 75 communicates with the bottom side fluid pressure chamber 76 of the arm cylinder 75.

The supply port 31, the discharge port 32, and the regeneration port 34 extending in the Z axis direction are opened side by side in the Y axis direction on the first bonding surface 41 of the valve block 30 bonded to the base block 10.

An accommodation hole 35 extending on the same axis as the supply port 31 (in the Z axis direction) is formed in the valve block 30. The supply valve 1 is accommodated in the accommodation hole 35. The supply valve 1 is placed between the supply port 31 and a linking port 36. The supply valve 1 is combined with the valve block 30 via a plurality of bolts 24. When the supply valve 1 is opened in the rod side switching module 51 of the boom cylinder 85, the working fluid flows from the first supply line 17 into the rod side fluid pressure chamber 87 of the boom cylinder 85 through the supply port 31, the supply valve 1, the linking port 36, and the actuator port 33.

The linking port 36 extending in the Y axis direction is formed in the valve block 30. The linking port 36 crosses the actuator port 33 and the regeneration port 34.

An accommodation hole 37 extending on the same axis as the linking port 36 (in the Y axis direction) is formed in the valve block 30. The discharge valve 2 is accommodated in the accommodation hole 37. The discharge valve 2 is placed between the linking port 36 and the discharge port 32. The discharge valve 2 is combined with the valve block 30 via a plurality of bolts 25. When the discharge valve 2 is opened in the rod side switching module 51 of the boom cylinder 85, the working fluid flows from the rod side fluid pressure chamber 87 of the boom cylinder 85 into the discharge line 18 through the actuator port 33, the linking port 36, the discharge valve 2, and the discharge port 32.

A relief circuit 43 in which the relief valve 6 is placed is provided in the valve block 30. The relief circuit 43 allows communication between the actuator port 33 and the discharge port 32. When a pressure difference (load pressure) between the actuator port 33 and the discharge port 32 is increased exceeding a predetermined value, the relief valve 6 is opened, so that the working fluid is released to the tank 23.

The regeneration port 34 is connected to the actuator port 33 in parallel to the supply port 31 and the discharge port 32. The regeneration port 34 extends on the same axis as the actuator port 33 and crosses the linking port 36.

In the rod side switching module 51 of the boom cylinder 85, the first bonding surface 41 of the valve block 30 is bonded to the first attachment surface 11 of the base block 10. Thereby, the supply port 31 and a port 27 of the first supply line 17 are connected to each other, the discharge port 32 and a port 28 of the discharge line 18 are connected to each other, and the regeneration port 34 and a port 29 of the first regeneration line 19 are connected to each other.

In the bottom side switching module 52 of the boom cylinder 85, the first bonding surface (not shown) of the valve block 30 is bonded to the first attachment surface 11 of the base block 10. Thereby, the supply port 31 (refer to FIG. 2) and the first supply line 17 are connected to each other, the discharge port 32 (refer to FIG. 2) and the discharge line 18 are connected to each other, and the regeneration port 34 and the second regeneration line 26 are connected to each other.

In such a way, the regeneration circuit 8 allowing communication between the regeneration port 34 of the rod side switching module 51 and the regeneration port 34 of the bottom side switching module 52 is provided in the boom cylinder 85. In order to provide the regeneration circuit 8, the port 29 extending from the first regeneration line 19 and being connected to the regeneration port 34 of the bottom side switching module 52 (refer to FIG. 4), and a port (not shown) extending from the second regeneration line 26 and being connected to the regeneration port 34 of the rod side switching module 51 are provided on the first attachment surface 11 of the base block 10.

In the rod side switching module 53 of the arm cylinder 75, the first bonding surface 41 of the valve block 30 is bonded to the second attachment surface 12 of the base block 10. Thereby, the supply port 31 and a port 47 of the first supply line 17 are connected to each other, and the discharge port 32 and a port 48 of the discharge line 18 are connected to each other. The regeneration port 34 is closed by the second attachment surface 12 of the base block 10.

In the bottom side switching module 54 of the arm cylinder 75, the first bonding surface (not shown) of the valve block 30 is bonded to the second attachment surface 12 of the base block 10. Thereby, the supply port 31 (refer to FIG. 2) and the second supply line 20 are connected to each other, and the discharge port 32 (refer to FIG. 2) and the discharge line 18 are connected to each other. The regeneration port 34 (refer to FIG. 2) is closed by the second attachment surface 12 of the base block 10.

No regeneration circuit allowing communication between the regeneration port 34 of the rod side switching module 53 and the regeneration port 34 of the bottom side switching module 54 is provided in the arm cylinder 75. Therefore, no port connected to the regeneration port 34 is provided on the second attachment surface 12 of the base block 10. Thereby, the regeneration ports 34 opened on the first bonding surfaces 41 of the valve blocks 30 of the switching modules 53, 54 as described above are closed by the second attachment surface 12 of the base block 10.

Figure 5:
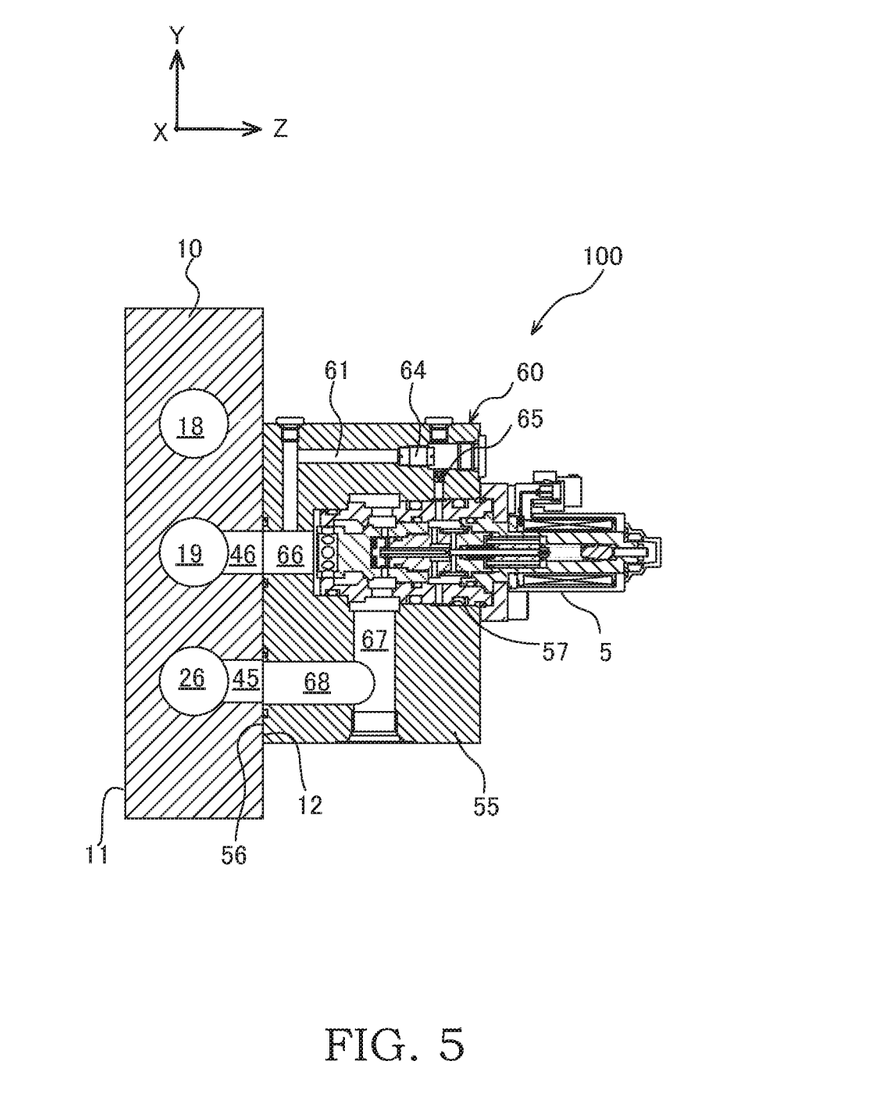
FIG. 5 is a sectional view taken along the line V-V of FIG. 3.

As shown in FIG. 5, the regeneration module 60 includes a valve block 55 combined with the base block 10, and the regeneration valve 5 that opens and closes the regeneration circuit 8. It should be noted that in FIG. 5, the merging module 70 is not shown.

The cubic valve block 55 has a bonding surface 56 extending in the X and Y axis directions. A regeneration valve port 66, a port 67, and a port 68 forming the regeneration circuit 8 are formed in the valve block 55. The regeneration valve port 66 and the port 68 extending in the Z axis direction are opened on the bonding surface 56. The bonding surface 56 of the valve block 55 is bonded to the second attachment surface 12 of the base block 10. Thereby, the regeneration valve port 66 and a port 46 of the first regeneration line 19 are connected to each other, and the port 68 and a port 45 of the second regeneration line 26 are connected to each other.

An accommodation hole 57 extending on the same axis as the regeneration valve port 66 (in the Z axis direction) is formed in the valve block 55. The regeneration valve 5 is accommodated in the accommodation hole 57. When the regeneration valve 5 is opened at the time of turning the boom 91 as described later, the working fluid flowing out from the rod side fluid pressure chamber 87 of the boom cylinder 85 flows into the bottom side fluid pressure chamber 86 of the boom cylinder 85 through the actuator port 33 of the rod side switching module 51, the regeneration port 34, the port 29 of the base block 10, the first regeneration line 19, the port 46, the regeneration valve port 66 of the regeneration module 60, the regeneration valve 5, the port 67, the port 68, the port 45 of the base block 10, the second regeneration line 26, and the actuator port 33 of the bottom side switching module 52 (refer to FIG. 2).

As shown in FIG. 3, the merging module 70 includes a valve block 71 combined with the base block 10 via a plurality of bolts 13, and the merging valve 4 that opens and closes a merging circuit 7.

The supply valve 1, the discharge valve 2, the merging valve 4, and the regeneration valve 5 are solenoid valves of the same structure, and the same parts are used.

Next, a specific configuration of the supply valve 1 will be described. As shown in FIG. 4, the supply valve 1 includes a pilot valve 62 that opens and closes a pilot pressure circuit 61 in accordance with an electric current flowing through a coil 69, and a poppet valve 63 that opens and closes the supply port 31 in accordance with pilot pressure of the pilot pressure circuit 61.

Through holes 38, 39 defining the pilot pressure circuit 61 are formed in the valve block 30. A check valve 64 is placed in the through hole 38. An orifice 65 is placed in the through hole 39. The check valve 64 is opened for a flow of the working fluid running from the supply port 31 toward the actuator port 33, and closed for a flow in the opposite direction.

When the electric current does not run through the coil 69, the pilot valve 62 blocks the pilot pressure circuit 61, and the poppet valve 63 blocks the supply port 31. Thereby, the flow of the working fluid running from the supply port 31 toward the actuator port 33 is stopped.

Meanwhile, when the electric current runs through the coil 69, the pilot valve 62 opens the pilot pressure circuit 61 by solenoid thrust force. Thereby, following a decrease in pilot pressure generated between the orifice 65 and the pilot valve 62, the poppet valve 63 opens the supply port 31. In accordance with a value of the electric current flowing through the coil 69, opening degrees of the pilot valve 62 and the poppet valve 63 are increased, so that a flow rate of the working fluid running from the supply port 31 toward the actuator port 33 is increased.

The supply valve 1 is not limited to a solenoid valve that drives the poppet valve 63 by the pilot pressure but may be a solenoid valve that drives a poppet valve or a spool valve by solenoid thrust force.

Next, actions of the hydraulic excavator 80 will be described.

At the time of contracting the boom cylinder 85 of turning the boom 91 downward (forward), the supply valve 1 of the rod side switching module 51 is opened, and the discharge valve 2 of the bottom side switching module 52 is opened. The merging valve 4 of the merging module 70 is opened. The regeneration valve 5 of the regeneration module 60 is closed. Thereby, the working fluid guided from the first pump 21 through the first supply line 17 and the working fluid guided from the second pump 22 through the second supply line 20 are merged by the merging valve 4 of the merging module 70, and flow into the rod side fluid pressure chamber 87 by the supply valve 1 of the rod side switching module 51. Meanwhile, the working fluid in the bottom side fluid pressure chamber 86 whose capacity is reduced flows out to the tank 23 through the discharge line 18 by the discharge valve 2 of the bottom side switching module 52. In such a way, the boom cylinder 85 is contracted, so that the boom 91 is turned downward.

At the time of extending the boom cylinder 85 of turning the boom 91 upward (rearward) at low speed, the supply valve 1 of the bottom side switching module 52 is opened, and the discharge valve 2 of the rod side switching module 51 is opened. The merging valve 4 of the merging module 70 is opened. The regeneration valve 5 of the regeneration module 60 is closed. Thereby, the working fluid guided from the first pump 21 through the first supply line 17 and the working fluid guided from the second pump 22 through the second supply line 20 are merged by the merging valve 4 of the merging module 70, and flow into the bottom side fluid pressure chamber 86 by the supply valve 1 of the bottom side switching module 52. Meanwhile, the working fluid in the rod side fluid pressure chamber 87 whose capacity is reduced flows out to the tank 23 through the discharge line 18 by the discharge valve 2 of the rod side switching module 51. In such a way, the boom cylinder 85 is extended, so that the boom 91 is turned upward.

At the time of extending the boom cylinder 85 of turning the boom 91 upward at high speed, the supply valve 1 of the bottom side switching module 52 is opened, and the discharge valve 2 of the rod side switching module 51 is opened. The merging valve 4 of the merging module 70 is opened. The regeneration valve 5 of the regeneration module 60 is opened. Thereby, the working fluid guided from the first pump 21 through the first supply line 17 flows into the bottom side fluid pressure chamber 86 by the supply valve 1 of the bottom side switching module 52. Meanwhile, the working fluid in the rod side fluid pressure chamber 87 whose capacity is reduced flows into the bottom side fluid pressure chamber 86 through the regeneration circuit 8. Since the regeneration circuit 8 is opened in such a way, the rod side fluid pressure chamber 87 of the boom cylinder 85 has the same pressure as the bottom side fluid pressure chamber 86. Thus, whereas the thrust force generated in the boom cylinder 85 is reduced, the working speed of extending the boom cylinder 85 is increased.

Meanwhile, at the time of contracting the arm cylinder 75 of turning the arm 92 forward, the supply valve 1 of the rod side switching module 53 is opened, and the discharge valve 2 of the bottom side switching module 54 is opened. Thereby, the working fluid guided from the second pump 22 through the second supply line 20 flows into the rod side fluid pressure chamber 77 by the supply valve 1 of the rod side switching module 53. Meanwhile, the working fluid in the bottom side fluid pressure chamber 76 whose capacity is reduced flows out to the tank 23 through the discharge line 18 by the discharge valve 2 of the bottom side switching module 54. In such a way, the arm cylinder 75 is contracted, so that the arm 92 is turned.

At the time of extending the arm cylinder 75 of turning the arm 92 backward, the supply valve 1 of the bottom side switching module 54 is opened, and the discharge valve 2 of the rod side switching module 53 is opened. Thereby, the working fluid guided from the second pump 22 through the second supply line 20 flows into the bottom side fluid pressure chamber 76 by the supply valve 1 of the bottom side switching module 54. Meanwhile, the working fluid in the rod side fluid pressure chamber 77 whose capacity is reduced flows out to the tank 23 through the discharge line 18 by the discharge valve 2 of the rod side switching module 53. In such a way, the arm cylinder 75 is extended, so that the arm 92 is turned.

It should be noted that the regeneration port 34 of the valve block 30 is not limited to form the regeneration circuit 8 but may form another circuit that guides the working fluid to the boom cylinder 85 and the arm cylinder 75 while bypassing the supply valve 1 and the discharge valve 2.

According to the above embodiment, the following effects are exerted.

The control valve device 100 includes the valve blocks 30 that switch the flowing direction of the working fluid supplied to and discharged from the boom cylinder 85 and the arm cylinder 75 (actuators). Each of the valve blocks 30 includes the actuator port 33 connected to the boom cylinder 85 or the arm cylinder 75, the supply port 31 communicating with the actuator port 33, the discharge port 32 communicating with the actuator port 33, and the regeneration port 34 communicating with the actuator port 33. The control valve device includes the supply valve 1 provided between the actuator port 33 and the supply port 31, and the discharge valve 2 provided between the actuator port 33 and the discharge port 32.

With this configuration, in a case where a circuit that guides the working fluid while bypassing the supply valve 1 and the discharge valve 2 is provided, the regeneration port 34 is opened. Meanwhile, in a case where this circuit is not provided in accordance with a machine type, the regeneration port 34 is closed. In such a way, by opening or closing the regeneration port 34 of the valve block 30, various circuits can be easily provided.

The common valve block 30 is used for both the switching modules 51, 52 of the boom cylinder 85 and the switching modules 53, 54 of the arm cylinder 75. Thus, there is no need for individually manufacturing the valve blocks 30. Therefore, manufacturing cost can be reduced.

Each of the switching modules 51, 52 of the boom cylinder 85 has the independent actuator port 33 in the valve block 30. Thus, in a case where a working failure or the like of the boom cylinder 85 is generated, a working failure point can be found by individually inspecting a working state of each of the switching modules 51, 52. In a case where a working failure is generated in the switching modules 51, 52, repair can be easily made by replacing the switching modules 51, 52 via the valve blocks 30.

The control valve device 100 further includes the base block 10 combined with the valve block 30, the base block that guides the working fluid supplied to and discharged from the boom cylinder 85 and the arm cylinder 75 (actuators). The base block 10 includes the supply line 17 allowing communication between the supply port 31 and the pump port 17A connected to the pump 21, and the discharge line 18 allowing communication between the discharge port 32 and the tank port 18A connected to the tank 23.

With this configuration, by combining the valve block 30 with the base block 10, the supply port 31 of the valve block 30 is connected to the supply line 17 of the base block 10, and the discharge port 32 of the valve block 30 is connected to the discharge line 18 of the base block 10. Therefore, there is no need for connecting a plurality of pipes or the like to the valve block 30, so that circuits of supplying and discharging the working fluid to and from the boom cylinder 85 and the arm cylinder 75 (actuators) can be easily provided.

The valve block 30 has the bonding surface 41 to be bonded to the base block 10. The supply port 31, the discharge port 32, and the regeneration port 34 are opened on the bonding surface 41.

With this configuration, by providing the port 29 or the like communicating with the regeneration port 34 in the base block 10, the working fluid is guided through the regeneration port 34 of the valve block 30 and the port 29 or the like of the base block 10. In a case where no port communicating with the regeneration port 34 is provided in the base block 10, the regeneration port 34 of the valve block 30 is closed by the bonding surface 41 of the base block 10. In such a way, by arbitrarily providing the port 29 or the like communicating with the regeneration port 34 in the base block 10 to be bonded to the bonding surface 41 of the valve block 30, various circuits can be easily provided.

The first attachment surface 11 and the second attachment surface 12 are provided in the base block 10. The valve block 30 is respectively bonded to the first attachment surface 11 and the second attachment surface 12.

With this configuration, the switching modules 51, 52 and the switching modules 53, 54 are provided on the first attachment surface 11 and the second attachment surface 12 of the base block 10. Thus, various circuits can be easily provided.

The switching modules 51, 52 and the switching modules 53, 54 are provided to be bonded to the first attachment surface 11 and the second attachment surface 12 of the base block 10. Thus, the control valve device 100 can be downsized.

The two valve blocks 30 are bonded to the base block 10. The actuator port 33 of one of the valve blocks 30 communicates with the inflow side fluid pressure chamber (any one of the bottom side chamber 86 and the rod side chamber 87) of the actuator (boom cylinder 85), and the actuator port 33 of the other valve block 30 communicates with the outflow side fluid pressure chamber (the other of the bottom side chamber 86 and the rod side chamber 87) of the actuator (boom cylinder 85). The base block 10 further includes the first regeneration line 19 connected to the regeneration port 34 of the one of the valve blocks 30, and the second regeneration line 26 connected to the regeneration port 34 of the other valve block 30. The control valve device further includes the regeneration module 60 combined with the base block 10, and the regeneration module 60 includes the regeneration circuit 8 connecting the first regeneration line 19 and the second regeneration line 26, and the regeneration valve 5 that opens and closes the regeneration circuit. 8

With this configuration, in the control valve device 100, by providing the first regeneration line 19 and the second regeneration line 26 in the base block 10, and providing the regeneration module 60 combined with the base block 10, the regeneration circuit 8 that guides the working fluid discharged from one of the fluid pressure chambers of the boom cylinder 85 to the other fluid pressure chamber can be easily additionally provided.

The control valve device 100 further includes the relief circuit 43 that guides the working fluid discharged from the boom cylinder 85 (actuator) to the discharge port 32 while bypassing the discharge valve 2, and the relief valve 6 provided in the valve block 30, the relief valve to be opened in accordance with an increase in pressure of the working fluid guided from the boom cylinder 85 to the relief circuit 43 to a set value or more.

With this configuration, by opening the relief valve 6, the working fluid from the boom cylinder 85 is discharged through the relief circuit 43. Thereby, the pressure of the working fluid in the boom cylinder 85 is suppressed from being increased to the set value or more. By providing the relief valve 6 in each valve block 30, relief pressure at which the relief valve 6 is opened can be individually set for each valve block 30, so that the relief pressure can be set in accordance with the circuit.

Embodiments of the present invention were described above, but the above embodiments are merely examples of applications of the present invention, and the technical scope of the present invention is not limited to the specific constitutions of the above embodiments.

For example, in the above embodiment, in the boom cylinder 85 provided as the actuator, the working fluid is supplied to and discharged from the rod side fluid pressure chamber 87 and the bottom side fluid pressure chamber 86 partitioned by the piston 88. In this case, for one boom cylinder 85, two valve blocks 30 are combined with one base block 10. The actuator is not limited to this but a ram cylinder type actuator in which a working fluid is supplied to and discharged from only a rod side fluid pressure chamber partitioned by a piston may be used. In this case, for one actuator, one valve block is combined with one base block.

In the above embodiment, the first attachment surface 11 and the second attachment surface 12 extend in parallel to each other on both sides of the base block 10, and the switching modules 51, 52 and the switching modules 53, 54 are provided to sandwich the base block 10. The present invention is not limited to this but the first attachment surface and the second attachment surface may be provided on adjacent surfaces of the base block.

Further, the actuator is not limited to a fluid pressure cylinder to be extended and contracted by working fluid pressure but a fluid pressure motor to be rotated by working fluid pressure may be used.

This application claims priority based on Japanese Patent Application No. 2014-49308 filed with the Japan Patent Office on Mar. 12, 2014, the entire contents of which are incorporated into this specification.

The invention claimed is:

1. A control valve device for controlling supply and discharge of a working fluid to and from an actuator, comprising:
   a valve block configured to switch the flowing direction of the working fluid supplied to and discharged from the actuator, the valve block including:
   an actuator port connected to the actuator;
   a supply port communicating with the actuator port;

a discharge port communicating with the actuator port; and a regeneration port communicating with the actuator port;

a supply valve provided between the actuator port and the supply port;

a discharge valve provided between the actuator port and the discharge port; and a base block combined with the valve block, the base block being configured to guide the working fluid to the actuator, wherein the valve block has a bonding surface to be bonded to the base block;

the supply port, the discharge port, and the regeneration port are configured to be opened at the bonding surface; and the regeneration port is opened at the bonding surface in a case where the control valve device includes a bypass circuit configured to guide the working fluid while bypassing the supply valve and the discharge valve, and the regeneration port is closed at the bonding surface in a case where the control valve device does not include the bypass circuit.

2. The control valve device according to claim 1, wherein the base block includes:
   a supply line configured to allow communication between the supply port and a pump port connected to a pump; and
   a discharge line configured to allow communication between the discharge port and a tank port connected to a tank.

3. The control valve device according to claim 1, wherein the valve block includes first and second valve blocks, a first attachment surface and a second attachment surface are provided in the base block, and the first valve block is bonded to the first attachment surface and the second valve block is bonded to the second attachment surface.

4. The control valve device according to claim 1, wherein the valve block includes two valve blocks that are bonded to the base block, the actuator port of one of the two valve blocks communicates with an inflow side fluid pressure chamber of the actuator, the actuator port of an other one of the two valve blocks communicates with an outflow side fluid pressure chamber of the actuator, the base block further includes:
   a first regeneration line connected to the regeneration port of the one of the valve blocks; and
   a second regeneration line connected to the regeneration port of the other valve block, the control valve device further comprises a regeneration module combined with the base block, and the regeneration module includes:
   a regeneration circuit configured to connect the first regeneration line and the second regeneration line; and
   a regeneration valve configured to open and close the regeneration circuit.

5. The control valve device according to claim 1, further comprising:
   a relief circuit configured to guide the working fluid discharged from the actuator to the discharge port while bypassing the discharge valve, wherein a relief valve to be opened in accordance with an increase in pressure of the working fluid guided from the actuator to the relief circuit to a set value or more is provided in the valve block.

* * * * *